(No Model.)

W. P. DODSON.
DISINTEGRATOR AND STRAINER.

No. 386,061. Patented July 10, 1888.

WITNESSES:
B. Ellwood.
S. L. Gillis.

INVENTOR.
Wilson P. Dodson.
per
Eg. Morgan Ellridge.
atty.

N. PETERS, Photo-Lithographer, Washington, D. C.

United States Patent Office.

WILSON P. DODSON, OF PHILADELPHIA, PENNSYLVANIA, ASSIGNOR OF ONE-HALF TO F. HOWARD ELDRIDGE, OF SAME PLACE.

DISINTEGRATOR AND STRAINER.

SPECIFICATION forming part of Letters Patent No. 386,061, dated July 10, 1888.

Application filed April 4, 1888. Serial No. 269,623. (No model.)

*To all whom it may concern:*

Be it known that I, WILSON P. DODSON, of the city and county of Philadelphia, State of Pennsylvania, have invented certain new and useful Improvements in Disintegrators and Strainers, of which the following is a specification.

The object of my invention is to provide a simple and efficient implement for preparing fruit and vegetables for the table by the division or the disintegration thereof into filamentous particles, and for pressing out the juices of small fruits, berries, and other substances.

To this end my improvements consist in the combination of a solid cup or receptacle and a perforated plunger or presser plate pivoted to one side of said cup, as shown in the accompanying drawings, in which—

Figure 1:
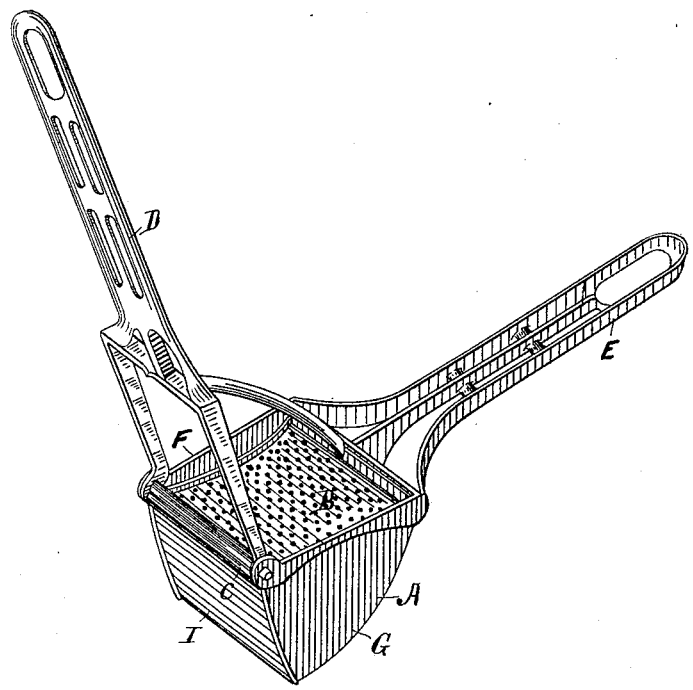
Figure 2:
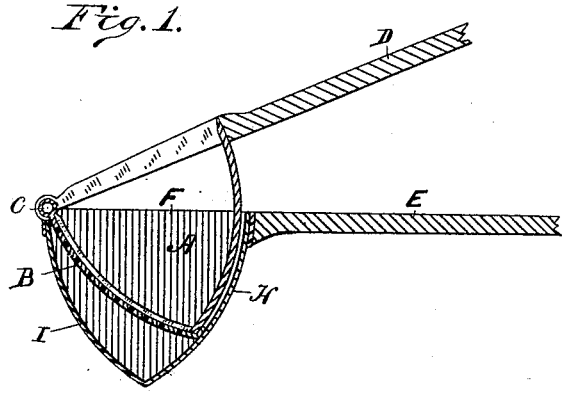

Figure 1 is an isometric view of a disintegrator or strainer embodying my improvements, shown as nearly open, and Fig. 2 is a vertical longitudinal section through the same, shown as nearly closed.

A is the cup having a handle, E.

B is the perforated presser-plate hinged to the cup at the joint C, and having a handle, D, the handle of the cup being connected with and extending from a frame, to which the cup is secured. The sides F G of the cup are in the plane of the line of motion of the pressing-plate upon its hinge. The side H is in the form of the arc of the circle swept by the pressing-plate moving upon its hinge, and the side I corresponds in its form to the form of the pressing-plate. The pressing-plate being removed by throwing back the handle, the cup is filled with the material to be disintegrated or pressed, as the case may be, and the perforated pressing-plate is pressed down upon it, forcing the material or the juices through the perforations in the plate.

I am aware that a strainer of general form somewhat similar to this has been made having perforated plates in the cup with a solid pressing-plate; but this is different from that, and an improvement upon it in various respects.

In mashing potatoes a boiled potato in its skin is put in the cup, and when the potato is mashed the skin ordinarily remains in the cup. With a perforated cup this skin must be entirely removed before mashing another potato; but with my solid cup and perforated pressing-plate one potato after another can be mashed until skins to a considerable quantity have accumulated in the cup, when the bulk of the accumulation can be removed without cleaning the cup, and the operation can be continued. If any portion of the skin adheres to the pressing-plate when it is taken out of the cup it can be very easily brushed off.

In pressing berries or any semi-fluid or mixed material the cup is filled with the material and the plate pressed down, separating the solid and fluid portions of the mass and holding the fluid portion in the cup, as in a ladle, from which it can be poured out as desired, and the operation can be repeated, as with the potato. If such material has seeds or particles so small that they would pass through the perforations, a cloth can be readily laid over the top of the cup holding them, and after pressing can be readily removed, whereas with a perforated cup this is very inconvenient. One handle can be rested upon the table and the other pressed down upon it, making the pressure by the weight of the arm, whereas with a perforated cup both handles must be held in the hands.

I claim as my invention—

1. In a disintegrator and strainer, the combination of a cup or receptacle having solid unperforated walls, and a perforated pressing-plate hinged to one side of the cup and adapted in its motion on its hinge to sweep three sides of the cup, substantially as specified.

2. In a disintegrator and strainer, the combination of a cup or receptacle having solid unperforated walls, a handle fixed thereto, and a handle pivoted to the receptacle and carrying a perforated pressing-plate adapted to be vibrated therein or entirely withdrawn therefrom, substantially as specified.

WILSON P. DODSON.

Witnesses:
 GEO. W. HANCOCK,
 HENRY J. HANCOCK.